(12) United States Patent
Sadamoto

(10) Patent No.: US 10,243,949 B2
(45) Date of Patent: Mar. 26, 2019

(54) CONNECTION SYSTEM AND CONNECTION METHOD

(71) Applicant: HEART FOREVER CO. LTD., Tokyo (JP)

(72) Inventor: Kenji Sadamoto, Tokyo (JP)

(73) Assignee: Heart Forever Co., Ltd., Tokyo (JP)

( * ) Notice: Subject to any disclaimer, the term of this patent is extended or adjusted under 35 U.S.C. 154(b) by 195 days.

(21) Appl. No.: 15/512,525

(22) PCT Filed: Sep. 9, 2015

(86) PCT No.: PCT/JP2015/075617
§ 371 (c)(1),
(2) Date: Mar. 17, 2017

(87) PCT Pub. No.: WO2016/043108
PCT Pub. Date: Mar. 24, 2016

(65) Prior Publication Data
US 2018/0219850 A1   Aug. 2, 2018

(30) Foreign Application Priority Data
Sep. 17, 2014 (JP) ................................. 2014-189047

(51) Int. Cl.
*H04L 29/06*   (2006.01)
*H04M 11/00*   (2006.01)
*H04L 29/08*   (2006.01)

(52) U.S. Cl.
CPC .......... *H04L 63/083* (2013.01); *H04L 67/141* (2013.01); *H04M 11/00* (2013.01)

(58) Field of Classification Search
CPC ..... H04L 63/083; H04L 67/141; H04M 11/00
See application file for complete search history.

(56) References Cited

U.S. PATENT DOCUMENTS 5,875,394 A * 2/1999 Daly .................... H04L 63/0869
340/5.74
7,757,274 B2 * 7/2010 Lillie .................... H04L 63/061
709/225

(Continued)

FOREIGN PATENT DOCUMENTS

| JP | 2004-080723 A | 3/2004 |
|---|---|---|
| JP | 2007-140715 A | 6/2007 |
| WO | 2009017181 A1 | 2/2009 |

OTHER PUBLICATIONS

International Search Report and Written Opinion for PCT App No. PCT/JP2015/075617 dated Dec. 15, 2015, 7 pgs.

(Continued)

*Primary Examiner* — Oleg Korsak
(74) *Attorney, Agent, or Firm* — Procopio, Cory, Hargreaves & Savitch LLP

(57) ABSTRACT

A connection server is a connection system that is able to perform communication with a plurality of user side terminals and establishes a connection between the user side terminals, and includes a passcode generator that generates and transmits a passcode to the user side terminal, a passcode storage unit that stores a passcode in association with the user side terminal, a passcode receiving unit that receives a transmission passcode from the user side terminal, a passcode authentication unit that determines whether there is a stored combination of passcodes that matches a combination of a generated passcode and a received transmission passcode, and a connection unit that establishes a connection between the user side terminals in response to the determination.

10 Claims, 11 Drawing Sheets

(56) References Cited

U.S. PATENT DOCUMENTS

| | | | |
|---|---|---|---|
| 2004/0073795 A1* | 4/2004 | Jablon | H04L 9/0844 |
| | | | 713/171 |
| 2004/0128509 A1* | 7/2004 | Gehrmann | H04L 63/062 |
| | | | 713/171 |
| 2006/0083187 A1* | 4/2006 | Dekel | H04L 63/0853 |
| | | | 370/310 |
| 2008/0072303 A1* | 3/2008 | Syed | H04L 63/0807 |
| | | | 726/10 |
| 2014/0325220 A1* | 10/2014 | Tunnell | G06F 21/00 |
| | | | 713/168 |
| 2016/0180072 A1* | 6/2016 | Ligatti | G06F 21/34 |
| | | | 726/7 |

OTHER PUBLICATIONS

International Preliminary Report on Patentability for PCT App No. PCT/JP2015/075617 dated Mar. 30, 2017, 7 pgs.

* cited by examiner

| NUMBER OF DUPLICATION USERS IN LAST AUTHENTICATION | NUMBER OF DIGITS OF PASSCODE SUBSEQUENTLY GIVEN |
|---|---|
| 0-50 | 2 |
| 51-500 | 3 |
| 501-5000 | 4 |
| 5001-50000 | 5 |

(b)

| 1ST SET(GIVEN) | 2ND SET(GIVEN) | NUMBER OF USERS IN DUPLICATION WITH 123456 |
|---|---|---|
| GIVEN CODE | GIVEN CODE | |
| 123 | 456 | 12 |

| 1ST SET | | 2ND SET | | 3RD SET | |
|---|---|---|---|---|---|
| NUMERICAL SEQUENCE | CURRENT NUMBER OF USE | NUMERICAL SEQUENCE | CURRENT NUMBER OF USE | NUMERICAL SEQUENCE | CURRENT NUMBER OF USE |
| 001 | 0 | 001 | 0 | 001 | 0 |
| 002 | 0 | 002 | 0 | 002 | 0 |
| 003 | 0 | 003 | 0 | 003 | 0 |
| 004 | 1 | 004 | 0 | 004 | 0 |
| 005 | 1 | 005 | 0 | 005 | 0 |
| 006 | 1 | 006 | 1 | 006 | 0 |
| 007 | 1 | 007 | 1 | 007 | 0 |
| 008 | 2 | 008 | 2 | 008 | 0 |
| ⋮ | | ⋮ | | ⋮ | |

(b)

| 1ST SET (GIVEN) | 2ND SET (GIVEN) | 3RD SET | |
|---|---|---|---|
| GIVEN CODE | GIVEN CODE | NUMBER OF OCCURRENCE OF DUPLICATIONS WHEN GIVEN | |
| 123 | 456 | 001 | 0 |
| | | 002 | 0 |
| | | 003 | 0 |
| | | 004 | 1 |
| | | 005 | 1 |
| | | 006 | 1 |
| | | 007 | 2 |
| | | 008 | 2 |
| | | ⋮ | |

Fig. 11

| 1ST SET | | 2ND SET | | 3RD SET | |
|---|---|---|---|---|---|
| NUMERICAL SEQUENCE | LATEST GENERATION TIME | NUMERICAL SEQUENCE | LATEST GENERATION TIME | NUMERICAL SEQUENCE | LATEST GENERATION TIME |
| 009 | 2014/9/17 00:00:00 | 002 | 2014/9/17 00:00:00 | 007 | 2014/9/17 00:00:00 |
| 005 | 2014/9/17 00:00:01 | 003 | 2014/9/17 00:00:01 | 001 | 2014/9/17 00:00:01 |
| 003 | 2014/9/17 00:00:02 | 012 | 2014/9/17 00:00:02 | 011 | 2014/9/17 00:00:02 |
| 007 | 2014/9/17 00:00:03 | 009 | 2014/9/17 00:00:03 | 002 | 2014/9/17 00:00:03 |
| 012 | 2014/9/17 00:00:04 | 006 | 2014/9/17 00:00:04 | 003 | 2014/9/17 00:00:04 |
| 013 | 2014/9/17 00:00:05 | 011 | 2014/9/17 00:00:05 | 012 | 2014/9/17 00:00:05 |
| 001 | 2014/9/17 00:00:06 | 008 | 2014/9/17 00:00:06 | 004 | 2014/9/17 00:00:06 |
| 010 | 2014/9/17 00:00:07 | 014 | 2014/9/17 00:00:07 | 015 | 2014/9/17 00:00:07 |
| 014 | 2014/9/17 00:00:08 | 007 | 2014/9/17 00:00:08 | 010 | 2014/9/17 00:00:08 |
| 006 | 2014/9/17 00:00:09 | 013 | 2014/9/17 00:00:09 | 013 | 2014/9/17 00:00:09 |
| 011 | 2014/9/17 00:00:10 | 015 | 2014/9/17 00:00:10 | 008 | 2014/9/17 00:00:10 |
| 015 | 2014/9/17 00:00:11 | 005 | 2014/9/17 00:00:11 | 014 | 2014/9/17 00:00:11 |
| 004 | 2014/9/17 00:00:12 | 010 | 2014/9/17 00:00:12 | 009 | 2014/9/17 00:00:12 |
| 008 | 2014/9/17 00:00:13 | 001 | 2014/9/17 00:00:13 | 006 | 2014/9/17 00:00:13 |
| 002 | 2014/9/17 00:00:14 | 004 | 2014/9/17 00:00:14 | 005 | 2014/9/17 00:00:14 |
| ... | | ... | | ... | | ns # CONNECTION SYSTEM AND CONNECTION METHOD

The present application is a National Stage entry of PCT/JP2015/075617, filed on Sep. 9, 2015, and claims priority to Japanese Patent Application No. 2014-189047, filed on Sep. 17, 2014.

TECHNICAL FIELD

The present invention relates to a connection system and a connection method for establishing a connection between terminals.

BACKGROUND ART

Traditionally, a one-time password has been used in the authentication of the use of computers and services. The one-time password is generated by a random number (for example, see the following Patent Literature 1), for example.

CITATION LIST

Patent Literature

Patent Literature 1: Japanese Unexamined Patent Publication No. 2007-140715

SUMMARY OF INVENTION

Technical Problem

In the meanwhile, there has been a conventional system that makes a plurality of terminals connect to one another via a network and perform transmitting and receiving of information. In order to establish the connection safely by identifying connection terminals, for example, there have been a method (1) that uses a user identifier (user-specific one such as an ID and an address) for identifying a user that is given to the user who uses the terminal, and a method (2) that uses a passcode that is a combination of numerals and characters that other than the user who uses the terminal to be an object of connection cannot know.

The method (1) is one that calls up the other party of the connection by using a user identifier, for example. In this method, if the user identifier is known, it is possible to identify and call up the user of the connection destination (communication destination) at all times. Accordingly, without having other communication method (without communicating user identifiers each time), the connection to the connecting party can be attempted. On the other hand, once a user identifier is leaked to a third party, by using the user identifier, anyone can attempt to gain access to that user. Thus, it becomes a problem in that it causes harassment communication and unsolicited communication. Examples include harassing calls, aggressive telemarketing calls, fraud calls, and the like due to the leakage of a telephone number, and spam damage and the like due to the leakage of an e-mail address.

Furthermore, in general, this identifier is often used also as a log-in ID in using a communication service that connects between terminals. By the fact that the log-in ID is disclosed, a malicious third party is able to log in spoofing if only a password is identified. Thus, as compared with the case that the log-in ID is kept in secret, the safety may substantially be impaired.

The method (2) is one that, by sharing in advance a common passcode between users who perform a connection and inputting the passcode into a server that performs the connection from the terminal of each user, performs transmitting and receiving of information in a user-specific common communication area indicated by the passcode. For the generation of such a passcode, a technique of generating a one-time password described in Cited Document 1 can be used, for example. In order to eliminate the disadvantages of the method (1), separately from a communication service that connects between the terminals of the users who desire to be interconnected, it is conceivable to employ the method (2) when there is a way to share a common passcode beforehand. For example, when a telephone communication between the users is being established and transmitting and receiving of information by characters is performed by the above-described communication service, it is conceivable to employ the method (2).

However, in the method (2), in order to increase the safety of a passcode, a passcode of a relatively large number of digits that is difficult to be estimated and inferred by the third party is often set. When a passcode of a larger number of digits is used, however, input errors and troubles are induced more often in delivering the passcode between users and in registering the passcode to a server. In particular, when the passcode is delivered by voice via the telephone communication as in the foregoing, the above-described problem is noticeable. Meanwhile, the duplication of passcode and the occurrence of safety issues are likely to occur when the number of digits of the passcode is simply made small.

The present invention has been made in order to solve the foregoing problems, and an object of the invention is to provide a connection system and a connection method that are capable of making the user easily carry out the delivery and input of a passcode used for establishing the connection between the terminals, and are capable of preventing the occurrence of the problems when the number of digits of the passcode is simply made small.

Solution to Problem

In order to achieve the above-described object, a connection system according to one embodiment of the present invention is a connection system that is able to perform communication with a plurality of terminals and establishes a connection between the terminals, and includes passcode generation means for generating and transmitting a first passcode to a first terminal; passcode storage means for storing therein a first passcode generated by the passcode generation means in association with the first terminal; passcode reception means for receiving a first transmission passcode from a second terminal; passcode authentication means for determining whether there is a first passcode that matches a first transmission passcode received by the passcode reception means and is stored by the passcode storage means; and connection means for establishing a connection between the first terminal and the second terminal; wherein the passcode generation means, when it is determined by the passcode authentication means that there is a matching first passcode, generates and transmits a second passcode that follows the first passcode to the second terminal; the passcode storage means stores therein a combination of the first passcode, and a second passcode generated by the passcode generation means, in association with the second terminal; the passcode reception means receives a second transmission passcode from the first terminal; the passcode authentication means determines whether there is a combination that matches a combination of a first passcode generated by the passcode generation means and a second transmission passcode received by the passcode reception means and is stored by the passcode storage means; and the connection means, when it is determined by the passcode authentication means that there is a matching combination, establishes a connection between a first terminal that is a transmission source of the second transmission passcode and a second terminal stored by the passcode storage means in association with the matching combination.

In the connection system according to one embodiment of the present invention, a passcode used in a connection between terminals can be generated in stages and alternately. Accordingly, the number of digits of the passcode delivered to the user at a time from the connection system can be made relatively small. Thus, according to the connection system in the one embodiment of the invention, it is possible to make the user carry out the delivery and input of a passcode easily. Furthermore, because the generation of a passcode is performed multiple times, it is possible to prevent the duplication of a passcode and the occurrence of safety issues when the number of digits of the passcode is simply made small.

The passcode generation means may generate the second passcode, when it is determined by the passcode authentication means that there is a matching first passcode, and when the matching first passcode is stored in duplication in the passcode storage means. With this configuration, it is possible to generate a second passcode only when there is a duplication. As a result, the burden on the delivery and input of a passcode of the user can be reduced.

The passcode generation means may, when it is determined by the passcode authentication means that there is a matching combination, generate a new second passcode that follows the second passcode used for the determination; the passcode authentication means may perform determination using the new second passcode generated by the passcode generation means; and the connection means may, when it is determined a certain number of times by the passcode authentication means that there is a matching combination, establish a connection between the first terminal and the second terminal. With this configuration, the generation of a passcode can be performed three times or more, and thus the flexibility in passcode generation can be improved.

The connection means may, when it is determined a set number of times by the passcode authentication means that there is a matching combination, establish a connection between the first terminal and the second terminal. With this configuration, inputting of the passcode the number of times that has been set is needed. Thus, brute-force connection attacks by a malicious third party can be avoided, and the safety can be improved, for example.

The passcode generation means may determine the number of digits of a passcode to generate in accordance with the passcode stored by the passcode storage means. With this configuration, in accordance with the usage degree of the connection system, the number of digits of the passcode can be made to an appropriate one.

The passcode generation means may generate a passcode in accordance with the passcode stored by the passcode storage means. With this configuration, the bias in passcodes to generate such as the occurrence of many duplications only on a certain passcode can be prevented, for example.

The passcode generation means may generate a passcode in accordance with also the time at which the passcode stored by the passcode storage means is generated. With this configuration, the bias in passcodes can be prevented while suppressing a calculation load.

The passcode generation means may accept a request from a first terminal and generate a first passcode, and the passcode authentication means may determine matching in accordance with whether a transmission source of a transmission passcode is a terminal that made the request. With this configuration, the determination of the passcode matching can be performed efficiently.

The connection means may, when it is determined by the passcode authentication means that there is a matching combination, transmit a passcode for confirmation to a first terminal that is a transmission source of a second transmission passcode and to a second terminal stored by the passcode storage means in association with the matching combination and, when information that a connection is approved is received from the first terminal and the second terminal in response to the transmission, establish a connection between the first terminal and the second terminal. With this configuration, it is possible to further improve the safety of the connection.

In the meanwhile, in addition to the fact that the present invention can be described as the invention of a connection system as in the foregoing, it can be also described as the invention of a connection method as follows. This is a substantively identical invention with only a difference in category, and has the same functions and advantageous effects.

That is, a connection method according to one embodiment of the present invention is a connection method that is an operation method of a connection system being able to perform communication with a plurality of terminals and establishing a connection between the terminals, and includes a passcode generation step of generating and transmitting a first passcode to a first terminal; a passcode storage step of storing a first passcode generated at the passcode generation step in association with the first terminal; a passcode reception step of receiving a first transmission passcode from a second terminal; a passcode authentication step of determining whether there is a first passcode that matches a first transmission passcode received at the passcode reception step and is stored at the passcode storage step; and a connection step of establishing a connection between the first terminal and the second terminal; wherein at the passcode generation step, when it is determined at the passcode authentication step that there is a matching first passcode, a second passcode that follows the first passcode is generated and transmitted to the second terminal; at the passcode storage step, a combination of the first passcode, and a second passcode generated at the passcode generation step is stored in association with the second terminal; at the passcode reception step, a second transmission passcode is received from the first terminal; at the passcode authentication step, whether there is a combination that matches a combination of a first passcode generated at the passcode generation step and a second transmission passcode received at the passcode reception step and is stored at the passcode storage step is determined; and at the connection step, when it is determined at the passcode authentication step that there is a matching combination, a connection is established between a first terminal that is a transmission source of the second transmission passcode and a second terminal stored at the passcode storage step in association with the matching combination.

Advantageous Effects of Invention

In one embodiment of the present invention, the number of digits of the passcode delivered to the user at a time from the connection system can be made relatively small. Thus, according to the one embodiment of the invention, it is possible for the user to carry out the delivery and input of the passcode easily. Furthermore, because the generation of a passcode is performed multiple times, it is possible to prevent the duplication of the passcode and the occurrence of safety issues when the number of digits of the passcode is simply made small.

BRIEF DESCRIPTION OF DRAWINGS

FIG. 7 is a diagram illustrating information used in a second modification.

FIG. 8 is a diagram illustrating information used in a third modification.

FIG. 11 is a diagram illustrating information used in the third modification.

DESCRIPTION OF EMBODIMENT

The following describes embodiment of a connection system and a connection method according to the present invention in detail with reference to the accompanying drawings. In the description of the drawings, for identical constituent elements, identical reference signs are given to and redundant explanations are omitted.

Figure 1:
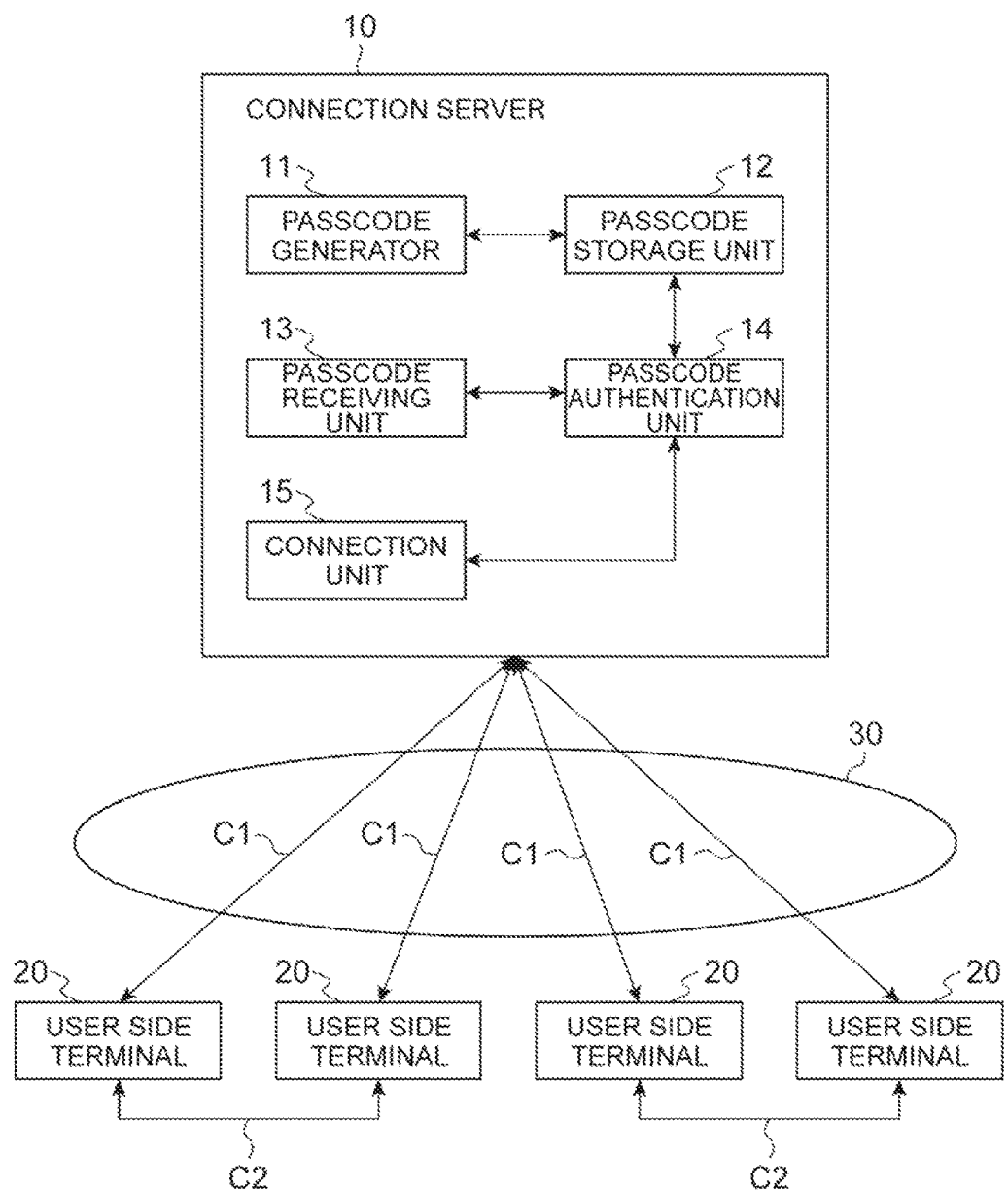
FIG. 1 is a diagram illustrating a configuration of a connection server that is a connection system according to an embodiment of the present invention.

FIG. 1 illustrates a connection server (server-side connection apparatus) 10 that is a connection system according to the present embodiment. The connection server 10 can perform communication with a plurality of user side terminals (user-side connection devices) 20 and constitutes a system that establishes a connection between the user side terminals 20. The connection server 10 and the user side terminal 20 can perform communication by a connection C1 via a communication network 30 structured by the Internet, a mobile communication network, and the like, for example.

The user side terminal 20 is a terminal used by a user. Specifically, the user side terminal 20 is a device capable of performing communication, and is specifically a portable terminal such as a mobile communication terminal and a smartphone or a personal computer (PC), for example. The user side terminal 20 can be connected to another user side terminal 20 by the connection server 10 and can perform communication (transmitting and receiving of information). The connection, specifically, corresponds to a web conference, on-line chat, and the like, for example. For example, in the user side terminal 20, an application for using functions of the connection server 10 is installed, and the user side terminal 20 connects to the connection server 10 by the application and receives the control from the connection server 10. The connection between the user side terminals 20 is performed via the communication network 30, for example. In the connection, a passcode (one time passcode) issued from the connection server 10 is used as will be described later.

The connection between the user side terminals 20 by the connection server 10 is performed when users of the user side terminals 20 do not have on hand information such as an e-mail address and a social networking service (SNS) account for connecting the user side terminals 20 to each other although the users are carrying out a telephone conversation, for example. The above-described telephoning may, as illustrated in FIG. 1, be performed by the user side terminals 20 via a connection C2 via a telephone line. The connection C2 may be of any means other than the telephone communication as long as it is other than the connection between the user side terminals 20 established by the connection server 10. The connection C2 may be via the communication network 30.

In that case, the connection between the user side terminals 20 by the connection server 10 is performed when the users do not have on hand the information for connecting the user side terminals 20 to each other by the other than the telephone communication. When the connection between the user side terminals 20 by the connection server 10 is established, the exchange of information such as characters, images, and electronic files that was not possible by the telephone communication can be performed between the user side terminals 20, for example. More specifically, the connection is performed when the user telephones an operator of television shopping and transmits the name and address by characters for purchasing merchandise, for example.

The connection server 10 is, specifically, implemented by a server apparatus configured with a computer including hardware such as a central processing unit (CPU), a memory, and a communication module. These constituent elements operate by programs or the like, thereby exercising the functions of the connection server 10 which will be described later. The functions of the connection server 10, the communication between the connection server 10 and the user side terminal 20, and the communication between the user side terminals 20 may be implemented by employing a computer telephony integration (CTI) function.

Figure 2:
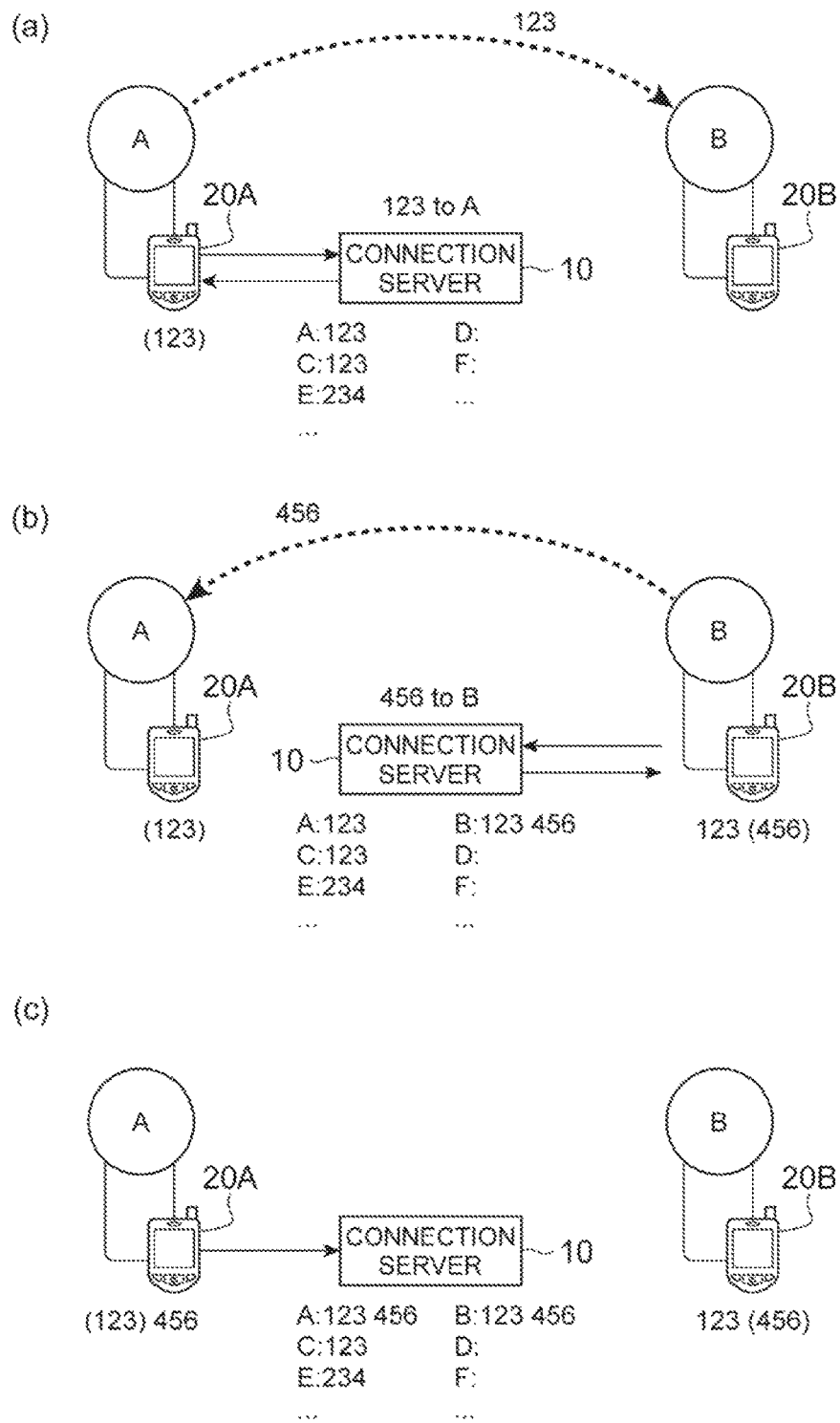
FIG. 2 is a diagram illustrating an overview of one example of a connection between user side terminals by the connection server.

Next, with reference to FIG. 2, an overview of one example of a connection between the user side terminals 20 by the connection server 10 will be described. It is assumed here that user side terminals 20A and 20B to be objects of connection are being used by users A and B, respectively. First, as illustrated in FIG. 2(a), by an operation of the user A to the user side terminal 20A, issuing a passcode is requested (asked) to the connection server 10 from the user side terminal 20A. In the connection server 10, the request is accepted and a passcode in response to the request is generated. Here, a passcode of "123" is generated. The generated passcode is transmitted from the connection server 10 to the user side terminal 20A. Furthermore, in the connection server 10, the passcode is stored in association with the user side terminal 20A.

In the user side terminal 20A, the passcode that was transmitted from the connection server 10 is received. In the user side terminal 20A, the display output and others of the received passcode is performed, and the passcode is recognized by the user A. Subsequently, from the user A to the user B, the fact that the passcode "123" has been issued is delivered. This delivery is carried out by telephoning as in the foregoing, for example. Alternatively, the delivery may be carried out by a method other than telephoning. For example, the delivery may be carried out directly by oral communication between the users A and B.

Then, as illustrated in FIG. 2(b), by an operation of the user B to the user side terminal 20B, the passcode of "123" is registered to the user side terminal 20B. The registered passcode is transmitted from the user side terminal 20B to the connection server 10. In the connection server 10, the passcode that was transmitted from the user side terminal 20B is received. In the connection server 10, of the passcodes that have already been issued and stored, it is determined whether there is one that matches the received passcode. Here, the passcode of "123" has been registered in association with the user side terminal 20A as in the foregoing. Furthermore, the passcode of "123" is being registered in association with a user side terminal 20C that is different from the user side terminals 20A and 20B. As just described, the passcode of "123" has been issued to a plurality of users (the user A and the user C) in duplication.

Thus, in the connection server 10, a new passcode that follows the passcode of "123" is generated. Here, a passcode of "456" is generated. The generated passcode is transmitted from the connection server 10 to the user side terminal 20B. Furthermore, in the connection server 10, the passcode received from the user side terminal 20B and the generated passcode are stored in association with the user side terminal 20B. That is, the passcode of "123 456" is stored in association with the user side terminal 20B.

In the user side terminal 20B, the passcode that was transmitted from the connection server 10 is received. In the user side terminal 20B, the display output and others of the received passcode is performed, and the passcode is recognized by the user B. Subsequently, from the user B to the user A, the fact that the passcode "456" has been issued in addition is delivered. This delivery is carried out as with the delivery to the user B from the user A.

Then, as illustrated in FIG. 2(c), by an operation of the user A to the user side terminal 20A, the passcode of "456" is registered to the user side terminal 20A. The registered passcode is transmitted from the user side terminal 20A to the connection server 10. In the connection server 10, the passcode that was transmitted from the user side terminal 20A is received. In the connection server 10, of the passcodes that have already been stored, it is determined whether there is one that matches a combination of the passcode "123" that has already been stored in association with the user side terminal 20A and the passcode "456" that was received from the user side terminal 20A. Here, the passcode of "123 456" has been registered in association with the user side terminal 20B as in the foregoing. Accordingly, in the connection server 10, it is determined that the passcode concerning the user side terminal 20A and the passcode concerning the user side terminal 20B are matching.

In the connection server 10, when there is no duplication of matching passcode, it is determined that those user side terminals 20A and 20B are the terminals to be connected to each other. That is, the passcodes of the user side terminals 20A and 20B match up, and the connection of those terminals is authenticated. In the connection server 10, in response to the determination, the control that causes those user side terminals 20A and 20B to connect to each other is performed. By the control, the connection between the user side terminals 20A and 20B is established. By the connection, between the user side terminals 20A and 20B, the exchange of characters, images, electronic files, and others via chat is made possible, for example.

Incidentally, in FIG. 2(c), at the determining of matching based on the passcode received from the user side terminal 20A, when the matching passcode other than the passcode concerning the user side terminal 20B has been stored, a passcode is further issued to the user side terminal 20A. In the above-described example, the passcode issued at a time is in three digits and is the one easily deliverable between the users A and B. The foregoing is one example of the connection between the user side terminals 20 by the connection server 10.

Next, the functions of the connection server 10 according to the present embodiment will be described. As illustrated in FIG. 1, the connection server 10 is configured including a passcode generator 11, a passcode storage unit 12, a passcode receiving unit 13, a passcode authentication unit 14, and a connection unit 15.

The passcode generator 11 is passcode generation means for generating and transmitting a passcode to the user side terminal 20. The passcode generator 11 generates a passcode of the number of digits that has been set. The passcode is a numeric string of one or more digits, for example. The passcode may include characters other than numerals. The number of digits of the passcode issued at a time is set as desired beforehand by an administrator (system side administrator) or a user of the connection server 10, for example. The number of digits may be set for each user side terminal 20. The generation of a passcode can be performed by using a conventional one-time password generating technique such as generation by a random number, for example.

If the number of digits of a passcode issued at a time is made to be small, the delivery and input of a common passcode becomes easy between users. If the number of digits is made to be large, it becomes easy to prevent the duplication of the passcode and improves the security. By appropriately setting the number of digits of the passcode, it becomes possible to achieve any desired balance between easiness and security.

The passcode generator 11 generates and transmits a first passcode that is a preceding passcode (initial passcode), to a first terminal that is one of the user side terminals 20 of objects of connection. Specifically, the passcode generator 11 accepts (receives) a passcode request that is a request for issuing a passcode from the first terminal, and with the acceptance of the passcode request as a trigger, generates a first passcode. In the passcode request, a user ID that is the information to identify the user side terminal 20 that is a request source is included. The passcode generator 11 outputs the first passcode that was generated and the user ID in association with each other to the passcode storage unit 12. The transmission of the passcode to the user side terminal 20 is carried out via the communication network 30.

The passcode generator 11 generates and transmits a second passcode that follows the first passcode, to a second terminal that is the other of the user side terminals 20 of objects of connection. The second passcode is generated based on the determination of the passcode authentication unit 14. The passcode generator 11 accepts a request for issuing a second passcode from the passcode authentication unit 14, and with the acceptance of the request as a trigger, generates the second passcode (performs the addition of the number of digits of the passcode). In the passcode request, a user ID that is the information to identify the user side terminal 20 that is an object of generating the second passcode (destination) is included. The passcode generator 11 outputs the second passcode that was generated and the user ID in association with each other to the passcode storage unit 12.

The passcode generator 11 can, repeatedly, generate a second passcode (performs a further (second and subsequent) addition of the number of digits of the passcode). The passcode generator 11, when generating a second passcode repeatedly, generates the passcode to the first terminal and the second terminal alternately. That is, when generating a second passcode newly after having generated a second passcode to the second terminal, the passcode is generated to the first terminal. Thereafter, when generating a second passcode newly, the passcode is generated to the second terminal.

When transmitting and receiving of information is performed between the user side terminal 20 and the connection server 10, a session is established between the user side terminal 20 and the connection server 10, and via the session, the transmitting and receiving of information is performed.

The passcode storage unit 12 is passcode storage means for storing therein a passcode in association with the user side terminal 20. The passcode storage unit 12, when a first passcode is input from the passcode generator 11, newly stores (registers) therein the passcode by associating it with a user ID that is in association with the passcode. When the second passcode is input into the passcode storage unit 12 from the passcode generator 11, a passcode (including a later-described transmission passcode) has already been stored in association with the user ID that is associated with the second passcode that was input. In that case, the passcode storage unit 12 stores (registers) therein the second passcode that was input by following the passcode that has already been stored in association with the user ID. That is, the passcode storage unit 12 stores therein the combination of a preceding passcode (including the first passcode) and a newly generated second passcode.

The passcode receiving unit 13 is passcode reception means for receiving a transmission passcode that is transmitted from the user side terminal 20. The passcode receiving unit 13 receives a first transmission passcode corresponding to a first passcode from the second terminal. The passcode receiving unit 13 receives an initial second transmission passcode corresponding to an initial second passcode from the first terminal. The passcode receiving unit 13 receives a second transmission passcode corresponding to a subsequent second passcode from either of the first terminal and the second terminal, in accordance with the user side terminal 20 of an object of generating the passcode. The reception of a transmission passcode from the user side terminal 20 is carried out via the communication network 30. The passcode receiving unit 13 receives, in addition to the reception of a transmission passcode, a user ID that is the information to identify the user side terminal 20 that is a transmission source of the transmission passcode.

The passcode receiving unit 13 outputs the transmission passcode and the user ID that have been received to the passcode storage unit 12. The passcode storage unit 12, when a transmission passcode is input from the passcode receiving unit 13, stores (registers) therein the transmission passcode in association with a user ID associated with the transmission passcode. Incidentally, when there is no passcode (including the transmission passcode) that has already been stored in association with the user ID, the passcode storage unit 12 newly stores (registers) therein the transmission passcode. When there is a passcode that has already been stored in association with the user ID, the passcode storage unit 12 stores (registers) therein the transmission passcode that was input by following the passcode that has already been stored.

The passcode receiving unit 13, after having received the transmission passcode and having stored it in the passcode storage unit 12, notifies the passcode authentication unit 14 of the user ID.

The passcode authentication unit 14 is passcode authentication means for performing authentication (verification) of a connection between the user side terminals 20 by using the transmission passcode received by the passcode receiving unit 13. The passcode authentication unit 14, when a user ID (user ID concerning the user side terminal 20 that is a transmission source of the transmission passcode that was received) is input from the passcode receiving unit 13, reads out the passcode stored in association with the user ID by the passcode storage unit 12.

The passcode authentication unit 14 determines whether there is a passcode that matches the read-out passcode and is stored in association with a user ID different from the user ID by the passcode storage unit 12.

When a transmission passcode is one that is newly stored by the passcode storage unit 12, the transmission passcode is the above-described first transmission passcode. In this case, the passcode that is read out by the passcode authentication unit 14 is only the first transmission passcode (having no preceding passcode). Accordingly, when a first transmission passcode is received, the passcode authentication unit 14 determines whether there is a first passcode that matches the first transmission passcode and is stored by the passcode storage unit 12.

When a transmission passcode is one that is stored by following the passcode that has already been stored by the passcode storage unit 12, the transmission passcode is the above-described second transmission passcode. In this case, the passcode that is read out by the passcode authentication unit 14 is a combination of a preceding passcode and the second transmission passcode. Accordingly, when a second transmission passcode is received, the passcode authentication unit 14 determines whether there is a passcode (combination of passcodes) that matches a combination of a passcode, which includes a first passcode and was generated by the passcode generator 11, and the received second transmission passcode and is stored by the passcode storage unit 12.

When the passcode authentication unit 14 determined that the matching passcode is being stored in the passcode storage unit 12, there is another user side terminal 20 that is to be connected (a candidate thereof) to the user side terminal 20 of the transmission source of the transmission passcode. The passcode authentication unit 14 determines whether there is only one matched passcode, that is, determines whether it is the passcode matching of only two users or the passcode matching of three or more users.

The passcode authentication unit 14, when determining that the matched passcode is only one (that is, passcode matching of only two users), identifies the user side terminal 20 indicated by the user ID in association with the relevant passcode, as the user side terminal 20 to be connected to the user side terminal 20 of the transmission source of the transmission passcode. The passcode authentication unit 14 notifies the connection unit 15 of the user IDs concerning those user side terminals 20.

The passcode authentication unit 14, when determining that the matched passcode is not only one (the matched passcode has been stored in duplication by the passcode storage unit 12, that is, passcode matching of three or more users), makes a request to the passcode generator 11 so as to generate a second passcode to the user side terminal 20 of the transmission source of the transmission passcode. In the request, the user ID concerning the user side terminal 20 of the transmission source of the transmission passcode is included.

That is, if the transmission passcode that was received is a first transmission passcode, the passcode authentication unit 14, when determining that a first passcode matching the first transmission passcode has been stored by the passcode storage unit 12, makes a request to the passcode generator 11 so as to generate a second passcode that follows the first passcode. Furthermore, if the transmission passcode that was received is a second transmission passcode, the passcode authentication unit 14, when determining that a passcode (combination of passcodes) matching a passcode including the second transmission passcode has been stored by the passcode storage unit 12, makes a request to the passcode generator 11 so as to generate a new second passcode that follows the passcode.

The passcode authentication unit 14, when determining that the matching passcode is not stored in the passcode storage unit 12 (there is no user holding an identical passcode other than the relevant user), notifies the user side terminal 20 of the transmission source of the transmission passcode that there was no matching passcode and prompts it to transmit the transmission passcode again. When a mismatch is determined (when passcode authentication is a mismatch) a preset number of times in the above-described determination on the identical user side terminal 20 of the transmission source of the transmission passcode, the passcode authentication unit 14 stops the connection processing concerning the user side terminal 20 and performs resetting that deletes the passcode stored in association with the user ID concerning the user side terminal 20 by the passcode storage unit 12. The deleted passcode is not used in the subsequent processing. The stopping of connection processing and the resetting of passcode may be carried out by the mismatch of one time.

The above-described mismatch of the passcode occurs only when either of the users who desire the connection made a delivery error or an input error. In particular, when it is a delivery error, the passcodes of both users never match no matter how many times the passcode is input repeatedly. Performing the stopping of connection processing and the resetting of passcode makes it possible to avoid an infinite loop.

The connection unit 15 is connection means for establishing a connection between the user side terminals 20 identified by the user IDs notified from the passcode authentication unit 14. The connection between the user side terminals 20 is carried out by using a technique of connection via the conventional communication network 30 between the terminals. This connection may be one that connects to each other in a communication area for each user side terminal 20 provided in the connection server 10 or may be one that is connected without going through the connection server 10, for example.

Once the connection between the user side terminals 20 is established, the passcodes stored in the passcode storage unit 12 in association with the user IDs concerning the user side terminals 20 are deleted.

Furthermore, in the above-described connection processing, when the reception of information from the user side terminal 20 is not made for a preset time (for the time, updating of passcode is not performed), or when the session between the user side terminal 20 and the connection server 10 is disconnected due to time-out and the like, the connection processing of the user side terminal 20 may be stopped (time out). In this case, carried out is the resetting that deletes the passcode stored in association with the user ID concerning the user side terminal 20 by the passcode storage unit 12. When performing the stopping of connection processing and the resetting of passcode, an error display may be performed in the user side terminal 20. When the authentication processing is interrupted due to some trouble or by intentional manipulation, the combination of passcodes already used is released, and thus the user who is forced to input an additional passcode needlessly can be reduced. The foregoing are the functions of the connection server 10 according to the present embodiment.

Figure 4:
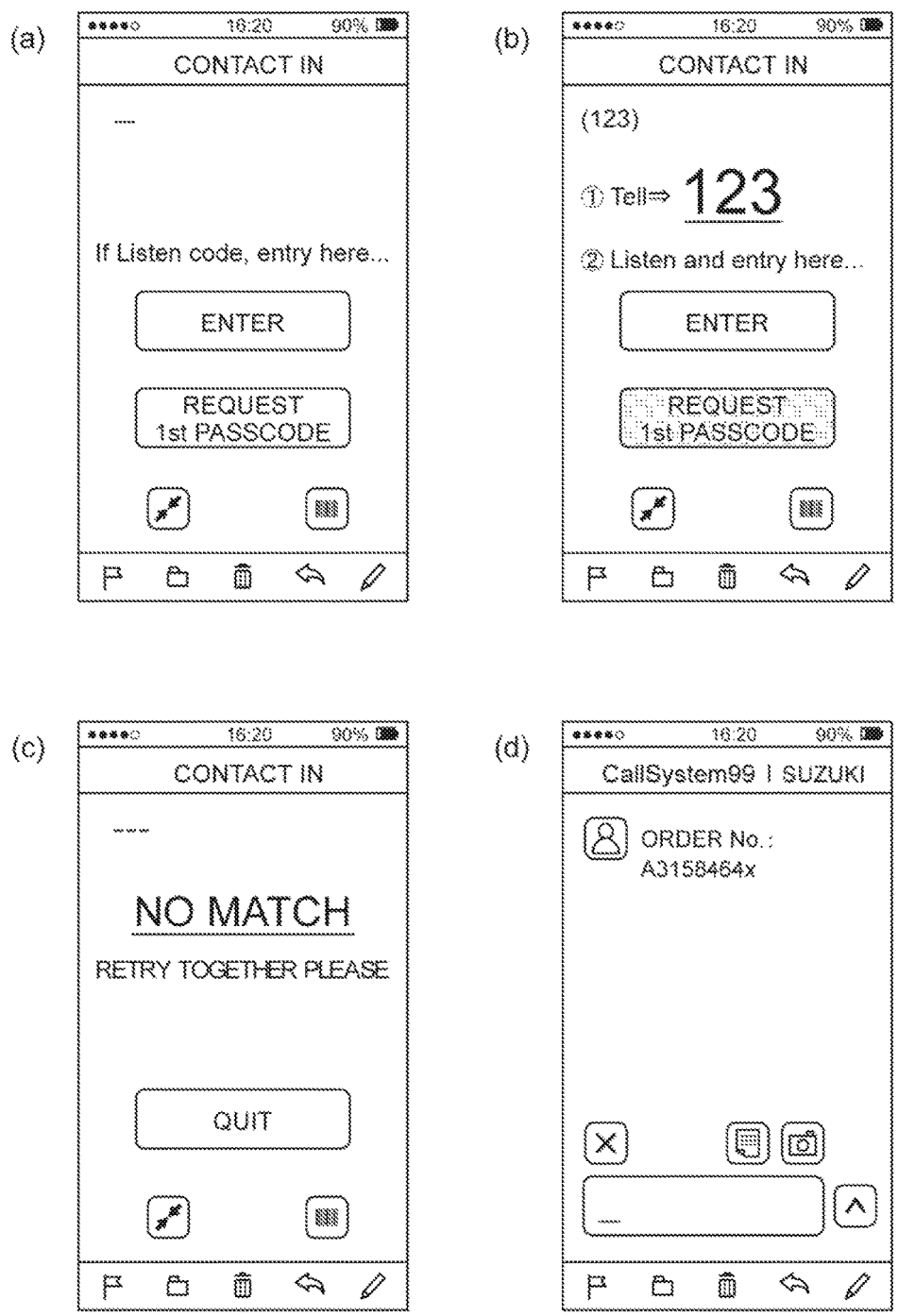
FIG. 4 is a diagram illustrating an example of screen displays in the user side terminal.
Figure 5:
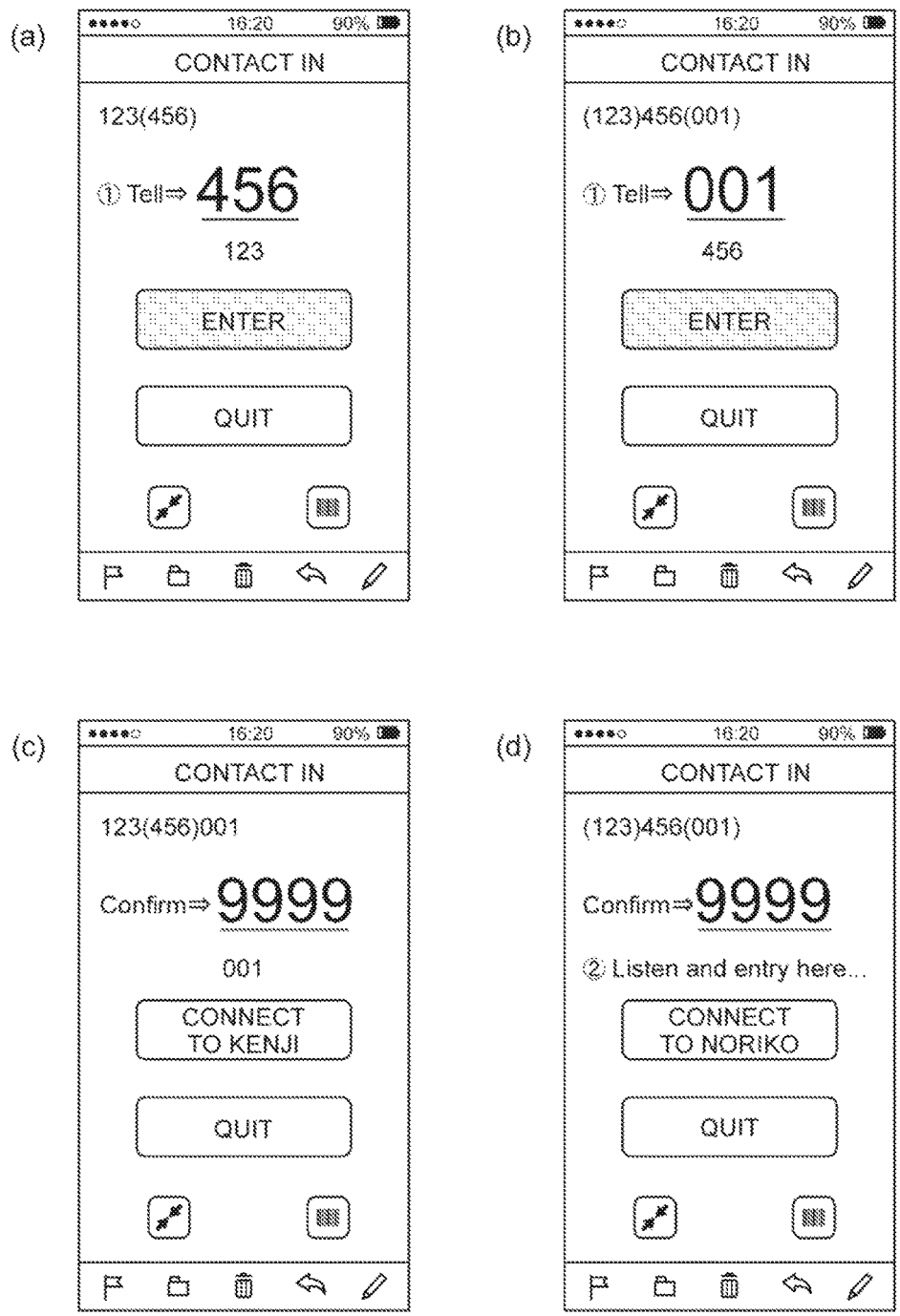
FIG. 5 is a diagram illustrating another example of screen displays in the user side terminal.

Next, with reference to the sequence diagram in FIG. 3, the processing (a connection method) executed by the connection server 10 that is an operation method of the connection server 10 according to the present embodiment will be described. In addition, by using FIGS. 4 and 5, examples of screen displays in the user side terminal 20 will be described. In the description, explained is an example that a connection between the user side terminal 20A that the user A carries and the user side terminal 20B that the user B carries is established. In FIG. 4(*a*), illustrated is an initial screen of an application for using the functions of the connection server 10 in the user side terminal 20A and the user side terminal 20B.

In the present processing, by the operation of the user A to the user side terminal 20A, a passcode request that is a request for issuing a passcode is made to the connection server 10 from the user side terminal 20A (S01). The operation is an operation of touching, for example, a button of "REQUEST 1st PASSCODE" illustrated in FIG. 4(*a*) in the initial screen of the application. In the passcode request, the user ID that is the information to identify the user side terminal 20A that is a request source is included.

In the connection server 10, by the passcode generator 11, the passcode request is received and accepted (S01, passcode generation step). Then, with the acceptance of the passcode request as a trigger, by the passcode generator 11, a first passcode that is an initial passcode is generated (S02, passcode generation step). The first passcode that has been generated is transmitted from the passcode generator 11 to the user side terminal 20A. The first passcode that was generated and the user ID are made to be associated with each other and are output to the passcode storage unit 12 from the passcode generator 11. In the passcode storage unit 12, the first passcode and the user ID that were input are newly stored (registered) in association with each other (S03, passcode storage step).

In the user side terminal 20A to which the first passcode was transmitted, the first passcode is received and the output of a display output and the like is performed. For example, as illustrated in FIG. 4(*b*), in the user side terminal 20A, the first passcode "123" that was transmitted from the connection server 10 is displayed. Then, the first passcode displayed by the user side terminal 20A is referred to and is recognized by the user A. Subsequently, from the user A to the user B, the fact that the passcode "123" has been issued is delivered (S04). This delivery is carried out by telephoning and the like, as in the foregoing.

Then, by an operation of the user B to the user side terminal 20B, the passcode that was delivered from the user A is input (registered) into the user side terminal 20B (S05). The operation is an operation of, in the initial screen of the application illustrated in FIG. 4(a), inputting the passcode with numeric keys and the like and touching a button of "ENTER" in the initial screen, for example. The passcode that was input into the user side terminal 20B is transmitted from the user side terminal 20B to the connection server 10. Furthermore, in addition to the transmission of the passcode, the user ID that is the information to identify the user side terminal 20B that is a transmission source is also transmitted.

In the connection server 10, by the passcode receiving unit 13, the passcode and the user ID are received (S05, passcode reception step). The passcode is a first transmission passcode. The first transmission passcode and the user ID that were received are made to be associated with each other and are output to the passcode storage unit 12 from the passcode receiving unit 13. In the passcode storage unit 12, the first transmission passcode and the user ID that were input are newly stored (registered) in association with each other (S06, passcode reception step).

Furthermore, when the transmission passcode is received, the user ID that was received is notified to the passcode authentication unit 14 from the passcode receiving unit 13. Then, by the passcode authentication unit 14, it is determined whether a passcode matching the passcode stored in association with the notified user ID is being stored (S07, passcode authentication step). That is, it is determined whether the passcode stored in association with the notified user ID is being stored in association with two or more users including the user of the transmission source of the transmission passcode.

As a result of the determination, when it is not stored in association with two or more users (that is, there is no matching user except for the user of the transmission source of the transmission passcode) (not depicted), the passcode authentication unit 14 notifies the user side terminal 20B of the transmission source of the first transmission passcode that there is no user who matches the passcode, and prompts the transmission of the transmission passcode again. For example, in the user side terminal 20B in response to the above-described notification, a display notifying the user of that fact is made as illustrated in FIG. 4(c). When a mismatch is determined (when passcode authentication is a mismatch) a preset number of times, stopping of connection processing and resetting of the passcode, with respect to the user side terminal 20B, are performed as error processing. In also the following processing, when there is no matching passcode, the same processing as that in the foregoing is performed.

As a result of the determination at S07, when only two users matched (that is, matching of only one user except for the user of the transmission source of the transmission passcode) (matching of only two users at S07), the two user side terminals 20 indicated by those user IDs are to be the user side terminals 20 that are connected to each other. In the case of the present processing, the user side terminal 20A and the user side terminal 20B are the user side terminals 20 that are to be connected to each other. In this case, the user IDs concerning those user side terminals 20 are notified to the connection unit 15 from the passcode authentication unit 14.

Then, by the connection unit 15, a connection between the user side terminals 20 identified by the notified user IDs is established (S08, connection step). By the connection processing, when the interconnection between the user side terminal 20A and the user side terminal 20B is established (S09), transmitting and receiving of information between the user side terminal 20A and the user side terminal 20B is made possible. In the user side terminal 20A and the user side terminal 20B, when the connection is established, a display indicating that the connection has been established as illustrated in FIG. 4(d) is made. Furthermore, after the connection processing by the connection unit 15, the passcodes stored in association with the user IDs concerning the user side terminals 20 for which the connection was established are deleted (S10). In this case, the processing is ended here.

As a result of the determination at S07, when three or more users matched (that is, matching of two or more users except for the user of the transmission source of the transmission passcode) (matching of three or more users at S07), a request is made to the passcode generator 11 from the passcode authentication unit 14 so as to generate a second passcode to the user side terminal 20B that is the transmission source of the first transmission passcode.

Then, when the request is made, by the passcode generator 11, a second passcode that follows the first passcode is generated (S11, passcode generation step). The second passcode that has been generated is transmitted from the passcode generator 1 to the user side terminal 20B. The second passcode that was generated and the user ID are made to be in association with each other and are output to the passcode storage unit 12 from the passcode generator 11. In the passcode storage unit 12, by following the passcode (first transmission passcode) that has already been stored in association with the user ID, the second passcode that was input is stored (registered) (S12, passcode storage step). In the subsequent processing, a series of passcodes stored by following ("123 456") is used in the authentication processing by the passcode authentication unit 14.

In the user side terminal 20B to which the second passcode was transmitted, the second passcode is received and the output of a display output and the like is performed. For example, as illustrated in FIG. 5(a), in the user side terminal 20B, the second passcode "456" that was transmitted from the connection server 10 is displayed. In the display of the user side terminal 20, a series of passcodes is displayed on the upper left. In a series of passcodes, the passcode that was generated by the connection server 10 is displayed in parentheses ("(456)" out of "123 (456)" in the example in FIG. 5(a)) and the passcode (transmission passcode) that was input on the user side terminal 20 is displayed without parentheses ("123" out of "123 (456)" in the example in FIG. 5(a)). Then, the second passcode displayed by the user side terminal 20B is referred to and is recognized by the user B. Subsequently, from the user B to the user A, the fact that the passcode "456" that follows the passcode "123" has been issued is delivered (S13). This delivery is carried out by telephoning and the like, as in the foregoing.

Then, by an operation of the user A to the user side terminal 20A, the passcode that was delivered from the user B is input (registered) into the user side terminal 20A (S14). The operation is carried out as with the inputting on the user side terminal 20B. The passcode that was input into the user side terminal 20A is transmitted from the user side terminal 20A to the connection server 10. Furthermore, in addition to the transmission of the passcode, the user ID that is the information to identify the user side terminal 20A that is a transmission source is also transmitted.

In the connection server 10, by the passcode receiving unit 13, the passcode and the user ID are received (S14, passcode reception step). The passcode is a second transmission passcode. The second transmission passcode and the user ID that were received are made to be associated with each other and are output to the passcode storage unit 12 from the passcode receiving unit 13. In the passcode storage unit 12, by following the passcode (first passcode) that has already been stored in association with the user ID, the second transmission passcode that was input is stored (registered) (S15, passcode storage step). In the subsequent processing, a series of passcodes stored by following ("123 456") is used in the authentication processing by the passcode authentication unit 14.

Furthermore, when the transmission passcode is received, the user ID that was received is notified to the passcode authentication unit 14 from the passcode receiving unit 13. Then, by the passcode authentication unit 14, it is determined whether a passcode matching the passcode stored in association with the notified user ID is being stored (S16, passcode authentication step). That is, it is determined whether the passcode stored in association with the notified user ID is being stored in association with two or more users including the user of the transmission source of the transmission passcode.

As a result of the determination at S16, when only two users matched (that is, matching of only one user except for the user of the transmission source of the transmission passcode) (matching of only two users at S16), the two user side terminals 20 indicated by those user IDs are to be the user side terminals 20 that are connected to each other. In the case of the present processing, the user side terminal 20A and the user side terminal 20B are the user side terminals 20 that are to be connected to each other. In this case, the user IDs concerning those user side terminals 20 are notified to the connection unit 15 from the passcode authentication unit 14. Then, by the connection unit 15, a connection between the user side terminals 20 identified by the notified user IDs is established (S17, connection step). By the connection processing, when the interconnection between the user side terminal 20A and the user side terminal 20B is established (S1.8), transmitting and receiving of information between the user side terminal 20A and the user side terminal 20B is made possible. Furthermore, after the connection processing by the connection unit 15, the passcodes stored in association with the user IDs concerning the user side terminals 20 for which the connection was established are deleted (S19). In this case, the processing is ended here.

As a result of the determination at S07, when three or more users matched (that is, matching of two or more users except for the user of the transmission source of the transmission passcode) (matching of three or more users at S16), a request is made to the passcode generator 11 from the passcode authentication unit 14 so as to generate a second passcode to the user side terminal 20A that is the transmission source of the second transmission passcode.

Thereafter, the processing subsequent to S11 is repeated by interchanging the user side terminal 20A and the user side terminal 20B (such that a passcode is issued alternately). That is, to the user side terminal 20 of the transmission source of the transmission passcode, a new second passcode is generated and transmitted. Furthermore, by the passcode storage unit 12, when a second passcode that was newly generated is stored, it is stored by following the passcode that has been stored in association with the user ID by then.

Furthermore, by the passcode storage unit 12, when a second transmission passcode that was newly received is stored, it is stored by following the passcode that has been stored in association with the user ID by then. In FIG. 5(b), illustrated is a screen display of the user side terminal 20A when "001" that is a new passcode (further second passcode) to the user side terminal 20A was issued. This repeating is carried out until a connection is established or until, as error processing, stopping of connection processing and resetting of passcode are performed. The foregoing is the processing executed by the connection server 10 according to the present embodiment.

As in the foregoing, in the present embodiment, a passcode used in a connection between the user side terminals 20 can be generated in stages. Furthermore, the passcode can be generated alternately to each of the two user side terminals 20 to be the objects of connection. Accordingly, the number of digits of the passcode delivered to the user at a time from the connection system can be made relatively small. Even when there is a duplication of passcode, by issuing a new passcode, an appropriate connection between the user side terminals 20 can be carried out.

Thus, according to the present embodiment, it is possible for the user to carry out the delivery and input of a passcode easily. Furthermore, because the generation of a passcode is performed multiple times, it is possible to prevent the duplication of the passcode and the occurrence of safety issues when the number of digits of the passcode is simply made small. Specifically, in the present embodiment, even if a third party intercepted the telephone or the verbal exchange between the users who carry the user side terminals 20 that perform the connection (in the above-described example, between the user A and the user B), by the fact that the passcodes are issued to each of the user side terminals 20 alternately from the connection server 10, there is a merit on security in that it is difficult for the third party to perform interrupt access.

Figure 3:
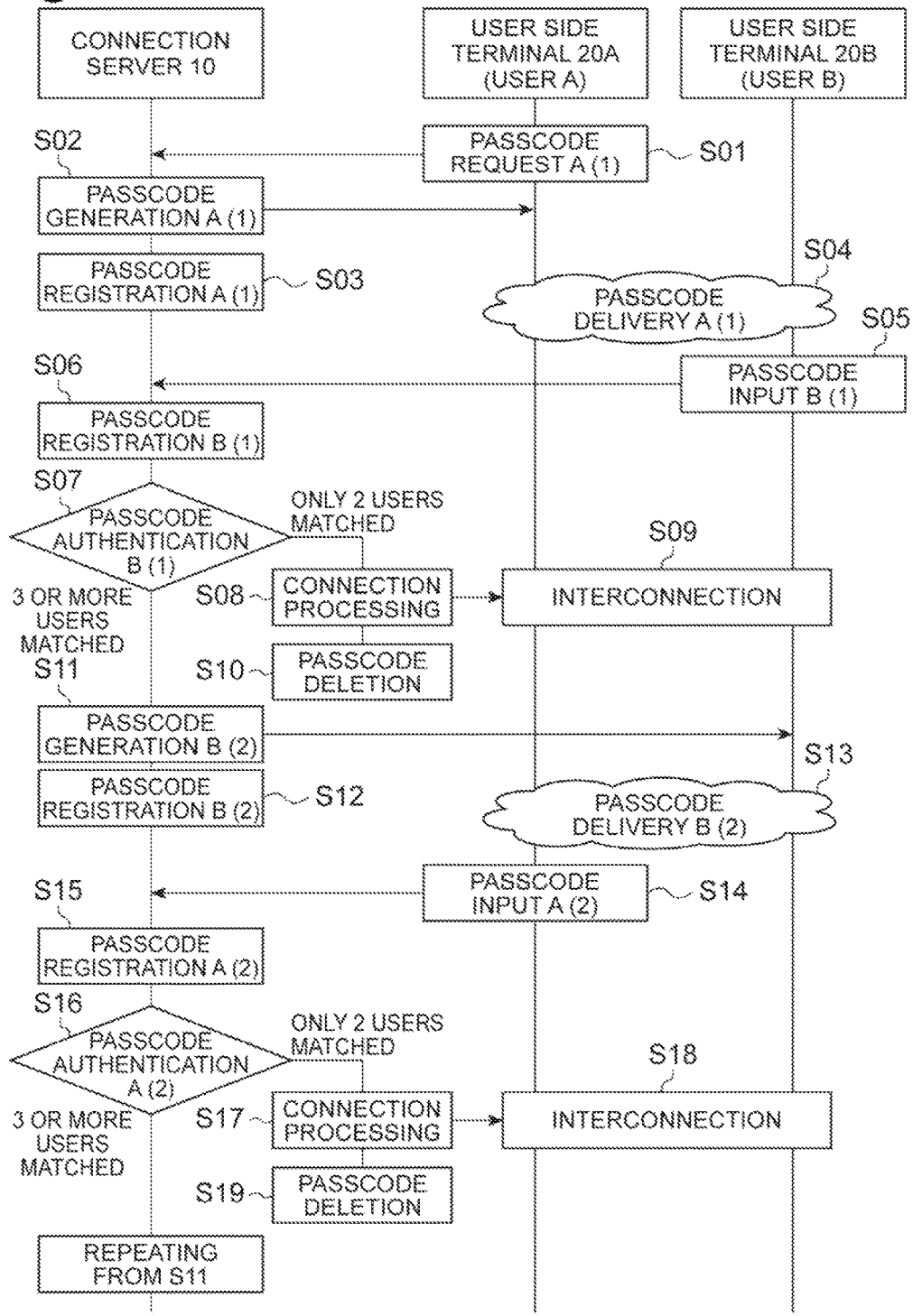
FIG. 3 is a sequence diagram illustrating processing (connection method) executed by the connection server that is the connection system in the embodiment of the present invention.

Furthermore, it may be configured to generate a passcode that precedes when there is a duplication of matching passcode as in the present embodiment (corresponds to matching of three or more users at S07 and S16 in FIG. 3). With this configuration, it is possible to generate a second passcode only when there is a duplication. As a result, the burden on the delivery and input of a passcode of the user can be reduced.

Moreover, it may be configured such that it is possible to generate passcodes three or more times for the connection of one time as in the present embodiment. With this configuration, the flexibility in passcode generation can be improved.

Next, modifications of the embodiment of the present invention will be described. As for those points not specifically described, they are assumed to be the same as those in the above-described embodiment.

First Modification Example

In the above-described embodiment, as a result of passcode authentication, when two user side terminals 20 to be connected are determined (in the case of matching of only two users at S07 and matching of only two users at S16 in FIG. 3), the connection between the user side terminals 20 was permitted without generating a new passcode at that time. In the present modification example, after having determined the two user side terminals 20 that are to be connected, before permitting the connection between the user side terminals 20, the generation of additional passcodes (second passcodes) and the authentication are performed the number of times that was set.

In this case, the passcode authentication unit 14, when the two user side terminals 20 that are to be connected were determined as a result of authentication (the result of determination of passcode matching), counts the number of times of the authentication (determination of passcode matching) from there. The passcode authentication unit 14 keeps the above-described set number of times stored in advance and, when the counted number of times reaches the set number of times, notifies the connection unit 15 of the user IDs concerning the user side terminals 20 to be connected.

As just described, the connection unit 15 may be configured to establish the connection between the user side terminals 20 when it is determined, the set number of times, by the passcode authentication unit 14 that there is a matching combination of passcodes. Furthermore, the number of times may not be the number of times after having determined the two user side terminals 20 that are connected. For example, it may be configured to establish the connection when the number of times from the first authentication (before the two user side terminals 20 that are to be connected are determined) reaches the set number of times.

Figure 6:
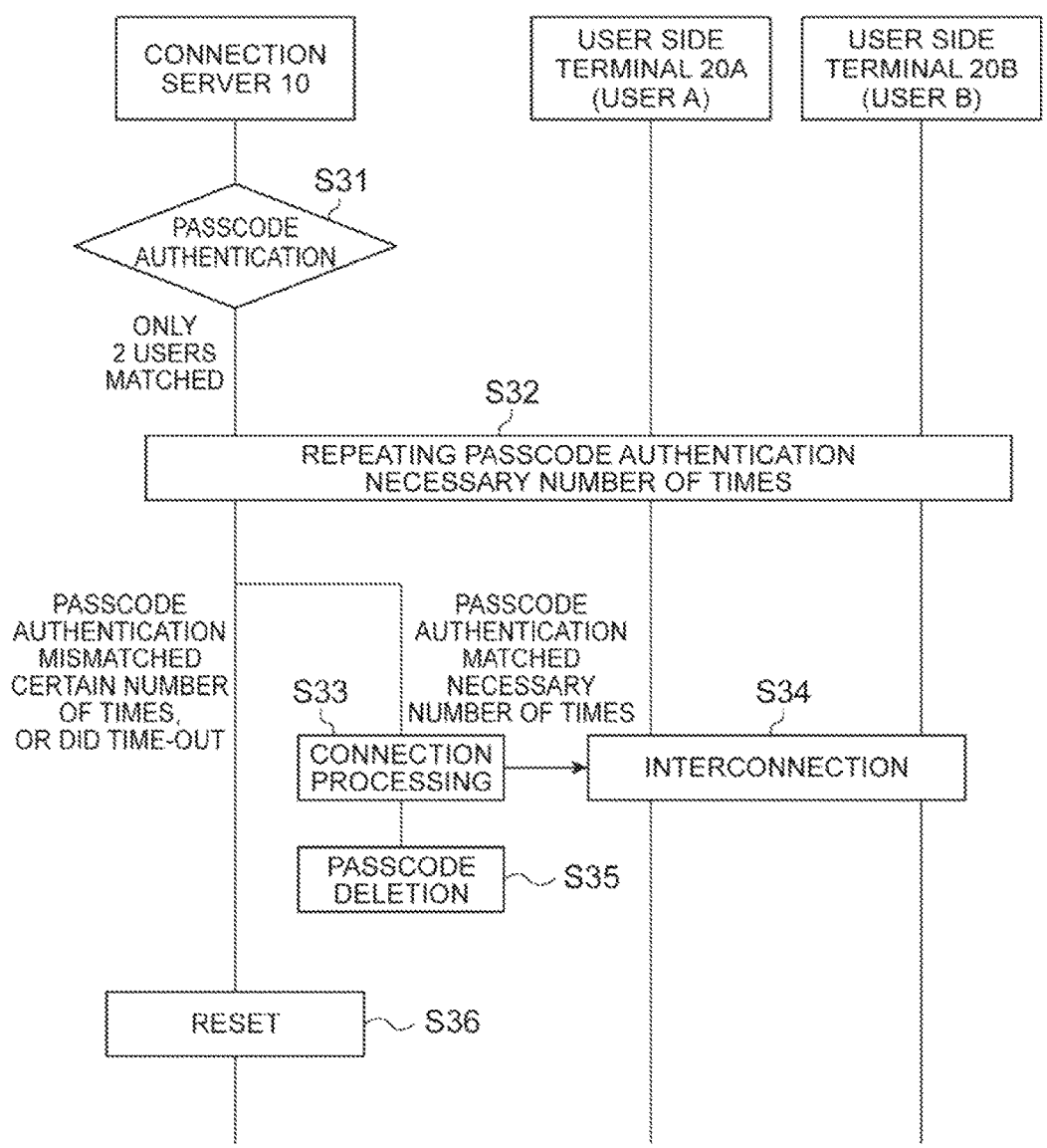
FIG. 6 is a sequence diagram illustrating the processing (connection method) executed in a first modification by the connection server that is the connection system in the embodiment of the present invention.

With reference to the sequence diagram in FIG. 6, the processing of the present modification example will be described. In the connection server 10, as with the above-described embodiment, by the passcode authentication unit 14, the determination of passcode matching is performed (S31, passcode authentication step). This processing is the same processing as that at S07, S16, and others in FIG. 3. As a result of the determination at S31, when only two users matched (when two user side terminals 20 to be connected were determined), the generation of a passcode and authentication of the passcode are repeatedly performed (S32). The unit of this repeating is equivalent to the processing from S11 to S16 in FIG. 3, for example.

By the passcode authentication unit 14, the number of repeats is counted. When the number of repeats reached the set number of times, the user IDs concerning the user side terminals 20 to be connected are notified to the connection unit 15 from the passcode authentication unit 14. Then, by the connection unit 15, a connection is established between the user side terminals 20 identified by the notified user IDs (S33, connection step). By the connection processing, when the interconnection between the user side terminal 20A and the user side terminal 20B is established (S34), transmitting and receiving of information between the user side terminal 20A and the user side terminal 20B is made possible. Furthermore, after the connection processing by the connection unit 15, the passcodes stored in association with the user IDs concerning the user side terminals 20 for which the connection was established are deleted (S35). In this case, the processing is ended here.

Meanwhile, when the passcode mismatched the number of times that was set in advance or a time-out occurred during the above-described repeats, stopping of the connection processing and resetting of the passcode are performed on the user side terminals 20 (S36).

According to the above-described configuration, inputting of passcode by the user the number of times that has been set is needed. Thus, brute-force connection attacks by a malicious third party can be avoided, and the safety can be improved, for example. Furthermore, it is possible to reduce the risk of causing an erroneous connection that arises from accidental matching of the passcodes of two users by input errors and the like. In theory, adding one time of passcode authentication reduces the risk of an erroneous connection to an inverse of the number obtained by multiplying (the number of character types used in passcode) by (the number of digits in passcode).

Second Modification Example

In the above-described embodiment, it has been configured that the number of digits of a passcode generated in the connection server 10 is to be set in advance by the administrator and others of the connection server 10. In the present modification example, the number of digits is determined by the connection server 10.

The passcode generator 11 determines the number of digits of a passcode to generate in accordance with the passcodes stored by the passcode storage unit 12. Specifically, the passcode generator 11 receives, from the passcode authentication unit 14, a notice of how many other passcodes there were in duplication (of how many users there were in duplication) when passcode authentication was carried out. The passcode generator 11 determines, based on a rule stored in advance, the number of digits of the passcode that is subsequently generated in accordance with that number.

The passcode generator 11 stores in advance, as the above-described rule, the information in which the number of users in duplication in the last authentication and the number of digits of a passcode to subsequently generate are associated with each other as illustrated in FIG. 7(a). The passcode generator 11 determines, in the above-described information, the number of digits corresponding to the number of duplication users notified from the passcode authentication unit 14 to be the number of digits of a passcode to subsequently generate. For example, as illustrated in FIG. 7(b), it is assumed that, in a situation that a six-digit passcode of 123456 is already assigned to a certain user (user ID), there were 12 users (user IDs) in duplication. In this case, the passcode generator 11 determines that, based on the information illustrated in FIG. 7(a), a passcode to subsequently generate is in two digits, and it generates a two-digit passcode and gives it to the user.

The determination of the number of digits of the passcode may be based on not the number of duplication users but the rates of the duplication users.

With this configuration, in accordance with the usage degree of the connection server 10, the number of digits of the passcode can be made to an appropriate one. In particular, in a situation that the number of users is relatively small, the ease of delivery and input of the passcode can be improved while maintaining the security.

Third Modification Example

In the present modification example, the passcode generator 11 may be configured to generate the passcode in accordance with the passcodes stored by the passcode storage unit 12. In generating a passcode, by checking the combinations of passcodes that have already been generated, a passcode of a low duplication rate can be generated preferentially.

As illustrated in FIG. 8(a) for example, the passcode generator 11 refers to the passcodes stored by the passcode storage unit 12 and counts the number of stored passcodes (already generated) for each passcode. This counting is carried out for each issued set of passcodes (out of a series of passcodes, a set generated by the reception of what number of transmission passcode). The passcode generator 11 draws lots preferentially from the passcodes for which the number of counts is small (a small number of use), and generates (gives) a passcode.

In the example illustrated in FIG. 8(*a*), because there are three sets of non-use numerical sequences of "001", "002", and "003" in the first set of passcodes (first passcode), when generating a first set of passcode (first passcode), the passcode generator 11 draws lots from these three numerical sequences, and generates (gives) the passcode.

The passcode may be generated in the following manner. The passcode generator 11 counts the number for each series of passcodes generated and combined multiple times. The passcode generator 11 checks the passcode that has already been given to the user for whom a passcode is to be generated (being stored in association with the user ID by the passcode storage unit 12), and from the passcodes of smaller numbers of duplication users out of the combinations of a series of passcodes generated by a subsequently issued passcode (second passcode), draws lots preferentially and generates (gives) the passcode.

For example, a passcode of 123456 has already been assigned to a user of an object of giving a new passcode, and by giving a subsequent three-digit passcode, a set of nine-digit passcodes is assigned to the user. As illustrated in FIG. 8(*b*) for example, the passcode generator 11 has counted the number of stored passcodes (already generated) which are assigned "123456" for each subsequent three-digit passcode.

In the example illustrated in FIG. 8(*b*), because there are no other duplication users for the set of three nine-digit passcodes of "123456001", "123456002", and "123456003", the passcode is generated (given) by drawing lots from "001", "002", and "003".

With this configuration, the bias in generated passcodes such as the occurrence of many duplications only on certain passcodes can be prevented, for example. Out of the above-described two methods, in the method described with FIG. 8(*a*) as an example, as compared with the method described with FIG. 8(*b*) as an example, the amount of calculations to count the stored passcodes is less. Specifically, per one set, it only needs to count the number of numerical sequences of the third power of 10. On the other hand, when the numerical sequence for which the counted number is zero runs out and the numerical sequence of one or more has to be issued as a passcode, it is not possible to prevent the duplication completely.

In the method described with FIG. 8(*b*) as an example, as compared with the method described with FIG. 8(*a*) as an example, the amount of calculations in the number of occurrence of duplications is enormous. For example, in the example in FIG. 8(*b*), in giving the third set, it needs to count the number of duplications of the passcodes of the ninth power of 10 at the maximum. However, the probability of preventing the duplication is increased.

The passcode generator 11 may be configured to generate a passcode in accordance with also the time that the passcode stored by the passcode storage unit 12 was generated. In this case, as illustrated in FIG. 11, the passcode generator 11 stores, for each passcode (numerical sequence), the time at which the passcode that was stored by the passcode storage unit 12 was generated, for example. This storing is performed at the time of generating a passcode, for example, and is performed for each issued set of passcodes (out of a series of passcodes, a set generated by the reception of what number of transmission passcode). Furthermore, for each passcode, the latest generation time that is the time of the latest generation (the time last generated) is stored.

The passcode generator 11 draws lots preferentially from a certain number of passcodes (numerical sequences) in ascending order of the latest generation time, out of the passcodes (numerical sequences) that have been stored regarding the issued set corresponding to a passcode that is to be generated, and generates (gives) the passcode. As for the above-described certain number, any desired number can be set in advance. For example, as indicated by the hatching in FIG. 11, from 10 pieces of passcodes (numerical sequences) in ascending order of the latest generation time, a password to be generated is selected.

According to this method, as compared with the methods described with FIGS. 8(*a*) and 8(*b*) as examples, the probability of preventing duplication may be low. However, according to this method, a calculation load such as the calculations of addition and subtraction of the number of use of passcodes in each issued set and the calculations of duplications when passcodes of a subsequent issued set are given can be suppressed. Accordingly, speeding up the overall processing of the connection server 10 is possible. That is, with this configuration, the bias in passcodes can be prevented while suppressing the calculation load.

Fourth Modification Example

In the present modification example, the passcode authentication unit 14 may be configured to perform the matching determination in accordance with whether the transmission source of the transmission passcode is the user side terminal 20 that made a generation request of a first passcode (made a passcode request). In the present embodiment, when performing a connection between the user side terminals 20, those user side terminals 20 do not both make a generation request of a first passcode. Accordingly, the user side terminals 20 that made a generation request of a first passcode (a user group that first receives the issuance of the first passcode), or the user side terminals 20 that have not made a generation request of a first passcode (a user group that the first passcode was delivered) are not an object of connection to each other. The present modification example is in consideration of this.

In the present modification example, when the passcode storage unit 12 stores a passcode, in addition to that, whether the user ID in association with the passcode is the user side terminal 20 that made the generation request of a first passcode is kept stored. That is, it is kept managed to which user group each user belongs.

The passcode authentication unit 14, when a transmission passcode is received and the determination of passcode matching is performed, just needs to perform the determination only on the passcodes of a user group that is opposite to the transmission source of the transmission passcode (a user group that itself belongs to). It may be configured such that the matching of passcode is determined for all users, and such that, when the matching was of the users of the identical user group, the connection is prohibited.

With this configuration, the determination of passcode matching can be performed efficiently. Specifically, the passcode verification for the user group that itself belongs to can be cut, and it is possible to improve a search speed as the amount of calculations in passcode verification work is roughly halved.

Fifth Modification Example

In the above-described embodiment, as a result of passcode authentication, when two user side terminals 20 to be connected are determined (in the case of matching of only two users at S07 and matching of only two users at S16 in FIG. 3), the connection between the user side terminals 20 has been permitted. In the present modification example, after having determined two user side terminals 20 that are to be connected, before making a connection, a common confirmation dedicated passcode is issued to those user side terminals 20, and the connection is made after confirming that they have received the common confirmation dedicated passcode.

Specifically, when it is determined by the passcode authentication unit 14 that there is a matching combination of passcodes, the connection unit 15 transmits a common passcode for confirmation (confirmation dedicated passcode) to the respective user side terminals 20 that concern the user IDs stored in association with the matching passcodes. The connection unit 15, when received, in response to the transmission, the information that a connection is approved from both user side terminals 20, establishes the connection between the user side terminals 20. The confirmation dedicated passcode may be stored by the connection unit 15 in advance, or may be generated as with the generation of a passcode by the passcode generator 11.

As with the delivery of previous passcodes between the users, when the reception of the common confirmation dedicated passcode is confirmed between the users and the input of the approval of connection to the user side terminal 20 is made by the respective users, the connection is established.

Figure 9:
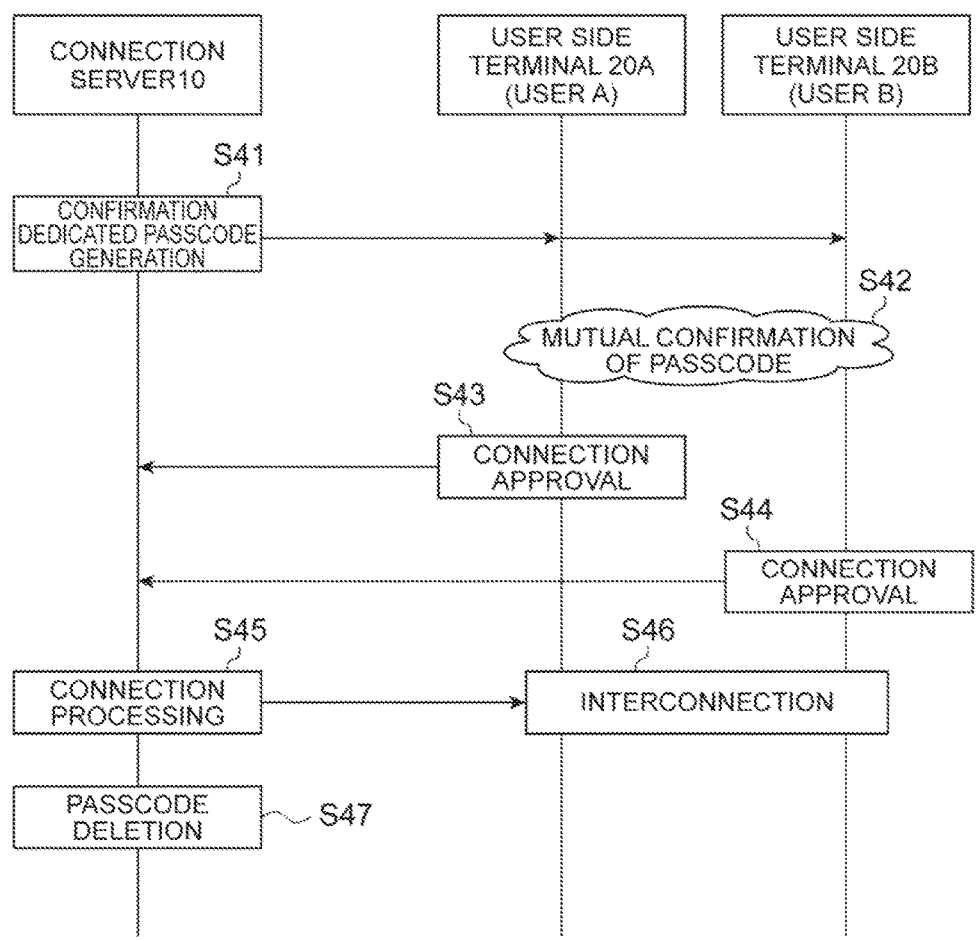
FIG. 9 is a sequence diagram illustrating the processing (connection method) executed in a fifth modification by the connection server that is the connection system in the embodiment of the present invention.

With reference to the sequence diagram in FIG. 9, the processing of the present modification example will be described. As with the above-described processing, in the connection server 10, as with the above-described embodiment, by the passcode authentication unit 14, the determination of passcode matching is performed. This processing is the same processing as that at S07, S16, and others in FIG. 3. As a result of the determination at S31, when only two users matched (when two user side terminals 20 to be connected were determined), the following processing will be performed.

In the connection server 10, by the connection unit 15, a confirmation dedicated passcode is generated and is transmitted to two of the user side terminal 20A and the user side terminal 20B that are to be connected (S41, connection step). In the user side terminal 20A and the user side terminal 20B to which the confirmation dedicated passcode was transmitted, the confirmation dedicated passcode is received and the output of a display output and the like is performed. For example, in the user side terminal 20A, as illustrated in FIG. 5(c), a confirmation dedicated passcode "9999" that was transmitted from the connection server 10 is displayed. Furthermore, in the user side terminal 20B, as illustrated in FIG. 5(d), the confirmation dedicated passcode "9999" that was transmitted from the connection server 10 is displayed.

Then, the confirmation dedicated passcode displayed by the user side terminal 20A and the user side terminal 20B is referred to and is recognized by the user A and the user B, respectively. Subsequently, that the confirmation dedicated passcode "9999" has been received is delivered between the user A and the user B (S42). This delivery is carried out by telephoning and the like, as in the foregoing.

Then, by the operation on the user side terminal 20A of the user A who has confirmed with the user B that the common confirmation dedicated passcode was received, the input indicating that the connection is approved is performed (S43). The operation is an operation of touching a button of "CONNECT TO KENJI" on the display screen illustrated in FIG. 5(c), for example. The information on the connection approval that was input into the user side terminal 20A is transmitted from the user side terminal 20A to the connection server 10. As with the user side terminal 20A, also from the user side terminal 20B of the user B who has confirmed with the user A that the common confirmation dedicated passcode was received, the information indicating that the connection is approved is transmitted to the connection server 10 (S44).

In the connection server 10, by the connection unit 15, the transmitted information indicative of the connection approval is received (S43, S44, connection step). When the information indicative of the connection approval is received from both the user side terminal 20A and the user side terminal 20B, by the connection unit 15, the connection between those user side terminals 20 is established (S45, connection step). By the connection processing, when the interconnection between the user side terminal 20A and the user side terminal 20B is established (S46), transmitting and receiving of information between the user side terminal 20A and the user side terminal 20B is made possible. Furthermore, after the connection processing by the connection unit 15, the passcodes stored in association with the user IDs concerning the user side terminals 20 for which the connection was established are deleted (S47). In this case, the processing is ended here.

After the transmission of the common confirmation dedicated passcode, when the above-described information was not received from at least one of the user side terminal 20A and the user side terminal 20B within a preset time due to the fact that the reception of the common confirmation dedicated passcode between the users was not confirmed and others, stopping of the connection processing and resetting of the passcodes are performed with respect to the user side terminal 20A and the user side terminal 20B. The above is the processing in the present modification example.

With this configuration, it is possible to further improve the safety of the connection. Specifically, it is possible to reduce the risk of causing an erroneous connection. Adding one time of passcode authentication reduces the risk of an erroneous connection to an inverse of the number obtained by multiplying (the number of character types used in passcode) by (the number of digits in passcode). As in the basic function of the present embodiment, in a system that issues a passcode to one of the users, and delivers and inputs the passcode to another user, there is a risk that the connection becomes invalid by a delivery error and an input error. By the present function, with respect to the final passcode authentication before the connection, it makes it possible to reduce the risk thereof.

Sixth Modification Example

In the above-described embodiment, it has been configured so that the stopping of connection processing and the resetting of passcodes are performed such as when a mismatch of passcodes was performed. However, it may be configured so that the stopping of connection processing and the resetting of passcode can be performed voluntarily from the user side terminal 20 side. In this case, the user side terminal 20 in connection processing can, by the operation of the user to the user side terminal 20, transmit to the connection server 10 the information requesting the stopping of connection processing and the resetting of passcode. In the connection server 10, when the request is received, the stopping of connection processing and the resetting of passcode are performed on the user side terminal 20 concerning the request.

Figure 10:
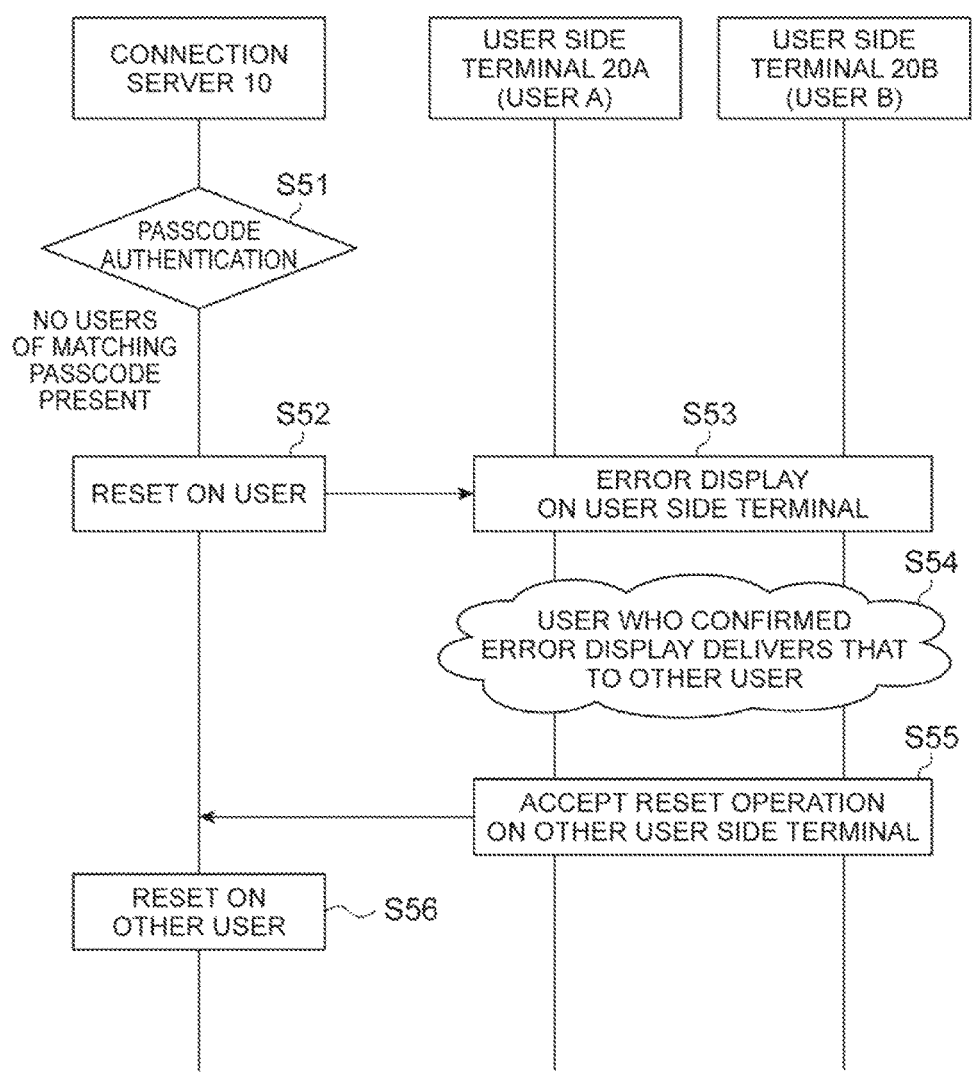
FIG. 10 is a sequence diagram illustrating the processing (connection method) executed in a sixth modification by the connection server that is the connection system in the embodiment of the present invention.

With reference to the sequence diagram in FIG. 10, an example of the processing of the present modification example will be described. In the connection server 10, as with the above-described embodiment, by the passcode authentication unit 14, the determination of passcode matching is performed (S51, passcode authentication step). This processing is the same processing as that at S07, S16, and others in FIG. 3. As a result of the determination at S51, when there is no user holding the same passcode other than the user, the stopping of connection processing and the resetting of passcode are performed on the user side terminal 20 concerning the passcode authentication (S52).

Furthermore, the relevant user side terminal 20 is notified of that fact from the connection server 10, and an error display is performed on the user side terminal 20 (S53). The error display is referred to by the user A, and that the authentication was not correctly performed is recognized. Subsequently, that fact is delivered to the other user from the user who has confirmed the error display (S54). Then, by the operation of the other user to the user side terminal 20, the information requesting the stopping of connection processing and the resetting of passcode is transmitted to the connection server 10 (S55). In the connection server 10, the information is received, and the stopping of connection processing and the resetting of passcode are performed on the other user side terminal 20 (S56). The above is the processing in the present modification example.

According to the above-described configuration, because the stopping of connection processing and the resetting of passcode can be performed voluntarily from the user side terminal 20 side, the user side terminal 20 can perform the connection again from the beginning. In the connection server 10, the stopping of connection processing that is substantively unable to connect and the resetting of passcode can be performed, and an efficient use of resources can be achieved.

Other Modification Examples

The user side terminal 20 may be configured to convert the passcode transmitted from the connection server 10 into voice data or non-voice data, and to deliver it to the other user side terminal 20 through a telephone communication, for example. Furthermore, the user side terminal 20 may be configured to convert the voice data or non-voice data received from the other user side terminal 20 into a passcode and to transmit it to the connection server 10. The conversion of voice data into a passcode and the conversion of a passcode into voice data can use conventional voice recognition and voice synthesis technologies. For the conversion of non-voice data, any desired conventional technology can be used.

When sharing a passcode through voice information such as telephone, it is easier to deliver the passcode by delivering it as much as possible in a clear voice easily transmitted to the other party or in a language familiar to the other party. Thus, the interruption of a process due to miscommunication is less likely to occur by the above-described configuration. Furthermore, by using the above-described configuration and linking it with the CTI function, the automation of continuous operation can be achieved, and it can make the connection work reliable and labor-saving.

In addition, by combining a function of automatic incoming and outgoing calls, a function of vocalizing character information, a function of characterizing vocal information, and others by the CTI technology, it makes it possible to encourage a connection operation such as chat between information terminals through a telephone line to a healthy person even from a hearing- or speech-impaired person and to achieve communication with each other.

In the above-described embodiment, in the connection server 10, the passcode has been stored and managed for each user side terminal 20. The passcode, however, may be stored and managed for each user side terminal 20 and for each session that is established by the user side terminal 20. Accordingly, the user side terminal 20 can, when a plurality of sessions can be established with the connection server 10, establish the connection with a plurality of other user side terminals 20 for each of those sessions.

REFERENCE SIGNS LIST

10 Connection Server
11 Passcode Generator
12 Passcode Storage Unit
13 Passcode Receiving Unit
14 Passcode Authentication Unit
15 Connection Unit
20 User Side Terminal
30 Communication Network

The invention claimed is:

1. A connection system that is able to perform communication with a plurality of terminals and establishes a connection between the terminals, the connection system comprising:
 passcode generation means for generating and transmitting a first passcode to a first terminal;
 passcode storage means for storing therein a first passcode generated by the passcode generation means in association with the first terminal;
 passcode reception means for receiving a first transmission passcode from a second terminal;
 passcode authentication means for determining whether there is a first passcode that matches a first transmission passcode received by the passcode reception means and is stored by the passcode storage means; and
 connection means for establishing a connection between the first terminal and the second terminal, wherein
 the passcode generation means, when it is determined by the passcode authentication means that there is a matching first passcode, generates and transmits a second passcode that follows the first passcode to the second terminal,
 the passcode storage means stores therein a combination of the first passcode, and a second passcode generated by the passcode generation means, in association with the second terminal,
 the passcode reception means receives a second transmission passcode from the first terminal,
 the passcode authentication means determines whether there is a combination that matches a combination of a first passcode generated by the passcode generation means and a second transmission passcode received by the passcode reception means and is stored by the passcode storage means, and
 the connection means, when it is determined by the passcode authentication means that there is a matching combination, establishes a connection between a first terminal that is a transmission source of the second transmission passcode and a second terminal stored by the passcode storage means in association with the matching combination.

2. The connection system according to claim 1, wherein the passcode generation means generates the second passcode, when it is determined by the passcode authentication means that there is a matching first passcode, and when the matching first passcode is stored in duplication in the passcode storage means.

3. The connection system according to claim 1, wherein
the passcode generation means, when it is determined by the passcode authentication means that there is a matching combination, generates a new second passcode that follows a second passcode used for the determination,
the passcode authentication means performs determination using the new second passcode generated by the passcode generation means, and
the connection means, when it is determined a certain number of times by the passcode authentication means that there is a matching combination, establishes a connection between the first terminal and the second terminal.

4. The connection system according to claim 3, wherein the connection means, when it is determined a set number of times by the passcode authentication means that there is a matching combination, establishes a connection between the first terminal and the second terminal.

5. The connection system according to claim 1, wherein the passcode generation means determines number of digits of a passcode to generate in accordance with a passcode stored by the passcode storage means.

6. The connection system according to claim 1, wherein the passcode generation means generates a passcode in accordance with a passcode stored by the passcode storage means.

7. The connection system according to claim 6, wherein the passcode generation means generates a passcode in accordance with also a time that a passcode stored by the passcode storage means is generated.

8. The connection system according to claim 1, wherein
the passcode generation means accepts a request from the first terminal and generates a first passcode, and
the passcode authentication means determines matching in accordance with whether a transmission source of a transmission passcode is a terminal that made the request.

9. The connection system according to claim 1, wherein the connection means, when it is determined by the passcode authentication means that there is a matching combination, transmits a passcode for confirmation to a first terminal that is a transmission source of the second transmission passcode and to a second terminal stored by the passcode storage means in association with the matching combination and, when information that a connection is approved is received from the first terminal and the second terminal in response to the transmission, establishes a connection between the first terminal and the second terminal.

10. A connection method that is an operation method of a connection system being able to perform communication with a plurality of terminals and establishing a connection between the terminals, the connection method comprising:
a passcode generation step of generating and transmitting a first passcode to a first terminal;
a passcode storage step of storing a first passcode generated at the passcode generation step in association with the first terminal;
a passcode reception step of receiving a first transmission passcode from a second terminal;
a passcode authentication step of determining whether there is a first passcode that matches a first transmission passcode received at the passcode reception step and is stored at the passcode storage step; and
a connection step of establishing a connection between the first terminal and the second terminal, wherein
at the passcode generation step, when it is determined at the passcode authentication step that there is a matching first passcode, a second passcode that follows the first passcode is generated and transmitted to the second terminal,
at the passcode storage step, a combination of the first passcode, and a second passcode generated at the passcode generation step is stored in association with the second terminal,
at the passcode reception step, a second transmission passcode is received from the first terminal,
at the passcode authentication step, whether there is a combination that matches a combination of a first passcode generated at the passcode generation step and a second transmission passcode received at the passcode reception step and is stored at the passcode storage step is determined, and
at the connection step, when it is determined at the passcode authentication step that there is a matching combination, a connection is established between a first terminal that is a transmission source of the second transmission passcode and a second terminal stored at the passcode storage step in association with the matching combination.

* * * * *